March 25, 1958  R. H. HELSEL ET AL  2,828,072
TICKET ISSUING MACHINE

Original Filed Oct. 11, 1950  13 Sheets-Sheet 1

INVENTORS.
REUBEN H. HELSEL &
RICHARD I. N. WEINGART
BY
ATTORNEYS.

INVENTORS.
REUBEN H. HELSEL &
RICHARD I. N. WEINGART
BY
ATTORNEYS.

March 25, 1958   R. H. HELSEL ET AL   2,828,072
TICKET ISSUING MACHINE

Original Filed Oct. 11, 1950   13 Sheets-Sheet 5

INVENTORS.
REUBEN H. HELSEL &
RICHARD I. N. WEINGART
BY
ATTORNEYS.

March 25, 1958  R. H. HELSEL ET AL  2,828,072
TICKET ISSUING MACHINE

Original Filed Oct. 11, 1950  13 Sheets-Sheet 6

INVENTORS.
REUBEN H. HELSEL &
RICHARD I. N. WEINGART
BY
ATTORNEYS.

INVENTORS.
REUBEN H. HELSEL &
RICHARD I. N. WEINGART
BY
ATTORNEYS.

INVENTORS.
REUBEN H. HELSEL &
RICHARD I. N. WEINGART
BY
ATTORNEYS.

March 25, 1958 R. H. HELSEL ET AL 2,828,072
TICKET ISSUING MACHINE
Original Filed Oct. 11, 1950 13 Sheets-Sheet 10

INVENTORS.
REUBEN H. HELSEL &
RICHARD I. N. WEINGART
BY
ATTORNEYS.

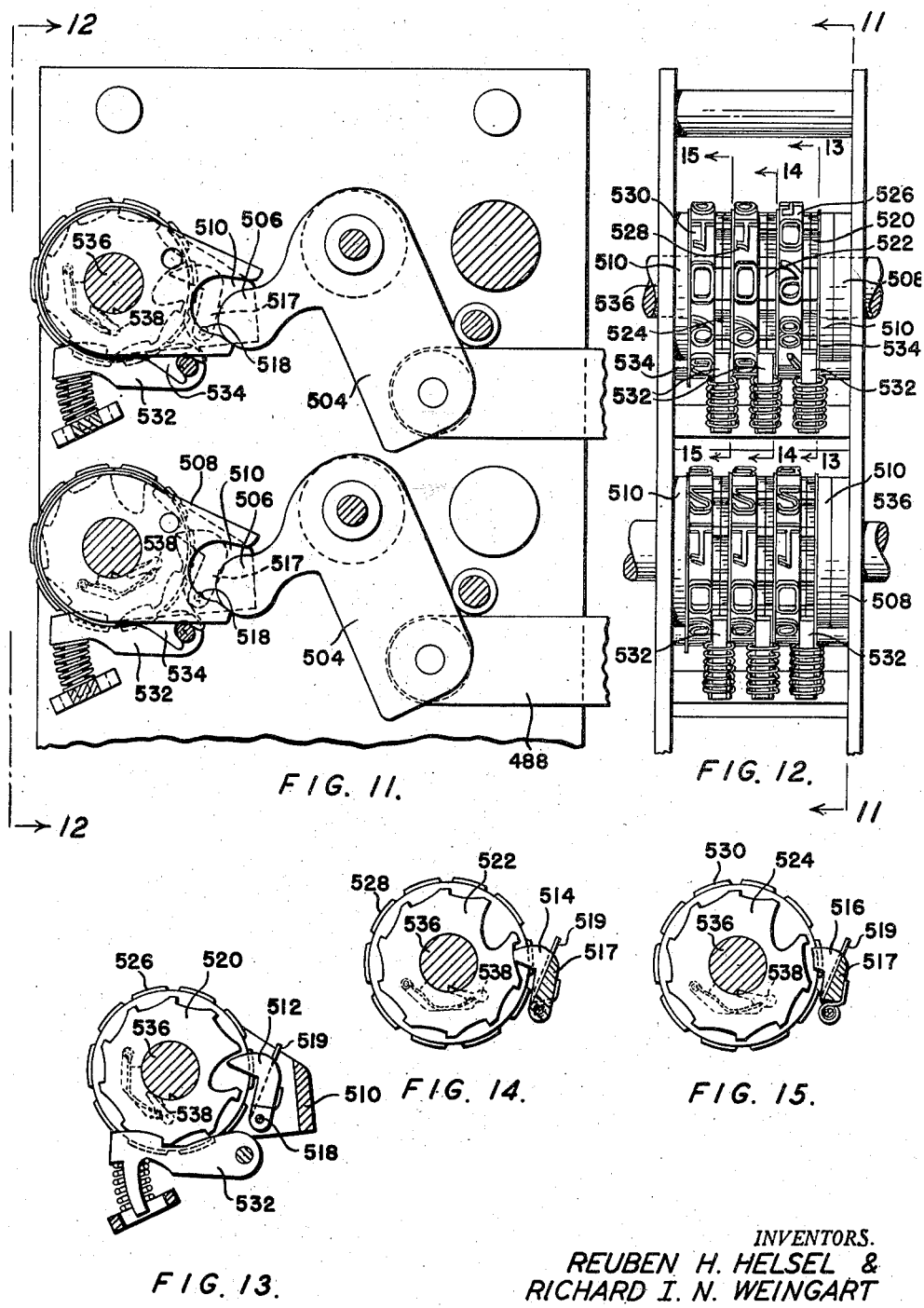

March 25, 1958 — R. H. HELSEL ET AL — 2,828,072
TICKET ISSUING MACHINE

Original Filed Oct. 11, 1950 — 13 Sheets-Sheet 13

$2.00 DAILY DOUBLE SALES — SECOND HALF

| | 1 | 2 | 3 | 4 | 5 | 6 | 7 | 8 | 9 | 10 | 11 | 12 | |
|---|---|---|---|---|---|---|---|---|---|---|---|---|---|
| ① | 002 | 008 | 005 | 003 | 010 | 006 | 009 | 003 | 002 | 007 | 009 | 003 | 067 |
| ② | 000 | 002 | 007 | 003 | 014 | 001 | 011 | 008 | 000 | 000 | 004 | 006 | 056 |
| ③ | 003 | 011 | 008 | 008 | 015 | 009 | 013 | 006 | 003 | 009 | 010 | 006 | 101 |
| ④ | 000 | 002 | 003 | 002 | 011 | 007 | 006 | 005 | 002 | 001 | 003 | 000 | 042 |
| ⑤ | 003 | 007 | 006 | 003 | 014 | 004 | 005 | 002 | 001 | 004 | 004 | 001 | 054 |
| ⑥ | 005 | 013 | 018 | 012 | 111 | 019 | 014 | 007 | 013 | 012 | 017 | 010 | 251 |
| ⑦ | 000 | 002 | 003 | 006 | 018 | 001 | 002 | 011 | 008 | 006 | 000 | 001 | 058 |
| ⑧ | 001 | 000 | 000 | 000 | 009 | 004 | 008 | 001 | 000 | 007 | 006 | 002 | 038 |
| ⑨ | 014 | 016 | 022 | 007 | 007 | 009 | 009 | 019 | 008 | 002 | 010 | 003 | 126 |
| ⑩ | 000 | 001 | 008 | 006 | 010 | 002 | 003 | 004 | 007 | 006 | 005 | 000 | 052 |
| ⑪ | 003 | 014 | 016 | 006 | 016 | 005 | 010 | 013 | 007 | 011 | 018 | 019 | 138 |
| ⑫ | 000 | 001 | 004 | 003 | 015 | 007 | 007 | 013 | 002 | 008 | 005 | 006 | 071 |
| TOTAL | 031 | 077 | 100 | 059 | 250 | 074 | 097 | 092 | 053 | 073 | 091 | 057 | 1054 |

FIG. 20.

INVENTORS.
REUBEN H. HELSEL &
RICHARD I. N. WEINGART
BY
ATTORNEYS.

United States Patent Office 2,828,072
Patented Mar. 25, 1958

2,828,072

TICKET ISSUING MACHINE

Reuben Harry Helsel, Long Island City, and Richard I. N. Weingart, Brookville, N. Y., assignors to General Register Corporation, Long Island City, N. Y., a corporation of New York Original application October 11, 1950, Serial No. 189,516. Divided and this application July 17, 1952, Serial No. 299,455

8 Claims. (Cl. 235—92)

This invention relates to ticket issuing machines and has particular reference to a machine for issuing so-called Daily Double tickets.

This application is a division of our application, Serial No. 189,516, now abandoned, filed October 11, 1950.

Totalisators in present use are capable of selectively issuing tickets for the contestants in single races but are not adapted for the issuance of tickets covering combinations of contestants in different races. If, for example, each of two races contains twelve contestants, it will be evident that the Daily Double possibilities number 144 combinations of the contestants in the two races. The object of a machine adapted to issue race tickets is not a matter of convenience in providing the tickets but, rather, its important aspect is that of recording the tickets which are issued and of preventing fraud. It will be evident that the issuance of, for example, 144 different types of tickets is a matter of some complexity and even more so is the matter of maintaining proper records of the issuance of each individual type of ticket. Records of the last are particularly important and must be readily accessible inasmuch as the odds which are paid are required to be calculated from such records.

It is the broad object of the present invention to provide a machine of the type indicated capable of issuing so-called Daily Double tickets and of keeping proper records of the issuance. While the invention will be described with particular reference to this problem, it will be evident that the invention is applicable to machines for other purposes as, for example, the issuing of transportation tickets between pairs of stations which may be selected from origin stations and destination stations. Or, in general, the machine is adapted for issuance of any tickets involving for their identification, or in their use, a combination of two independently chosen items. For example the machine may be used as a regular totalisator involving printing on the ticket as one item the number of the contestant and as the other item the number of the race. Or so-called Quinella tickets may be issued involving pairs of horses in the same race.

One of the objects of the present invention is the provision of a machine which may be tested by the issuance of test tickets without recording the same in such fashion as to be indistinguishable from tickets issued in the course of normal operation. Nevertheless, the test tickets are recorded so as to maintain a check on possibly unauthorized operation of the machine, and to secure control by comparison of the machine records with the serial numbers of opening and closing tickets.

A further object of the invention is the provision of an arrangement whereby records may be taken at any time from the machine to indicate the number of tickets issued for all possible combinations, together with totals and subtotals from which checks may be readily made on the proper operation of the machine.

Still another object of the invention is the provision of means for locking out unused numbers or the numbers of contestants which are scratched so that the keys corresponding thereto cannot be effective for the issuance of any tickets.

A further object of the invention is the provision of an improved printing mechanism for making records from a large number of printing heads simultaneously.

Still another object of the invention is the provision of recording devices serving for the instantaneous checking of the accuracy of operation of the machine whenever a record is made.

These and other objects of the invention particularly relating to details of construction will become apparent from the following description read in conjunction with the accompanying drawings, in which:

Figure 11 is an enlarged section showing details of portions of the accumulator mechanism, the section being taken on the plane at 11—11 in Figure 12;

Figure 12 is a fragmentary elevation viewed from the direction indicated at 12—12 in Figure 11;

Figures 13, 14 and 15 are, respectively, sections taken on the planes the traces of which are indicated at 13—13, 14—14 and 15—15 in Figure 12;

Figure 20 is a plan view showing an assembly of record sheets such as may be produced by the machine together with carbon sheets used in their printing.

Figure 1:
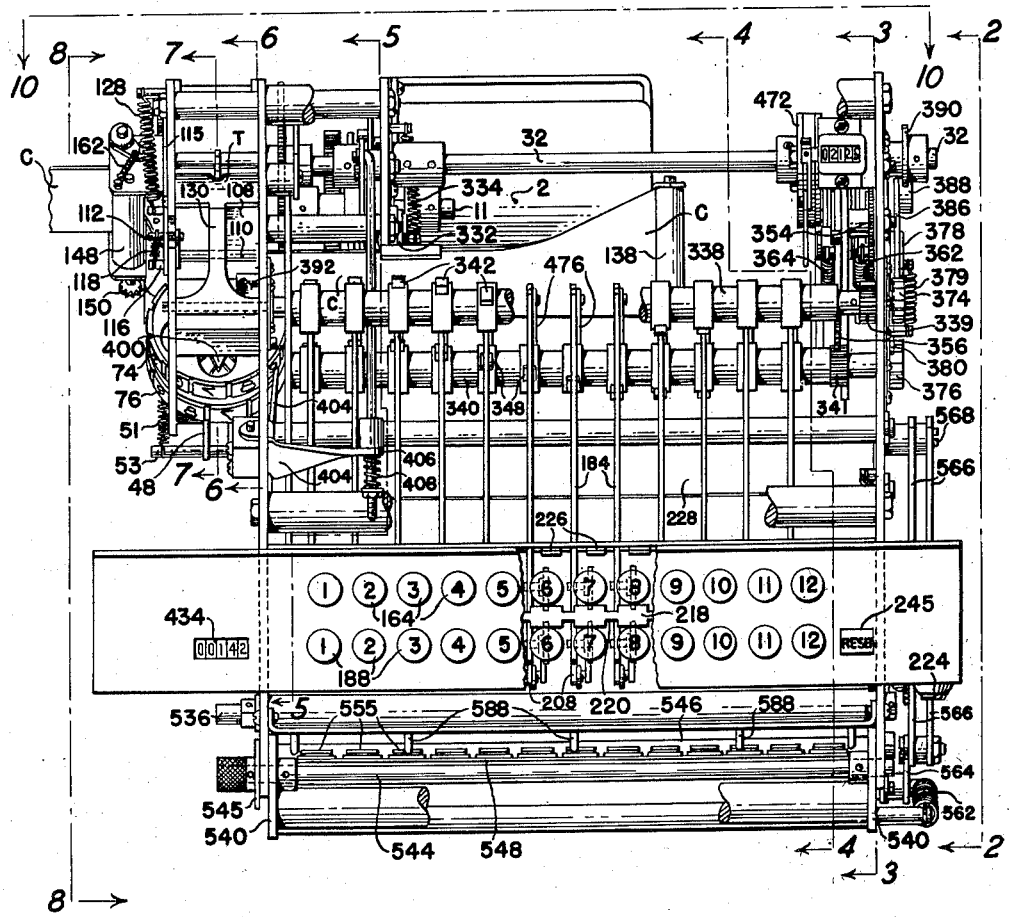
Figure 1 is a plan view of the operating mechanism of the machine.

Reference will first be made to the operating mechanism of the machine, the outer housing being referred to hereafter. The machine, in general, comprises a frame the details of which need not be described, it being understood that this frame generally comprises plates secured by interconnecting rods and other structures to provide fixed mountings for the operating parts.

On the shaft of a motor 2 there is a pinion 4 which drives a gear 6 with which rotates a second pinion 8. The pinion 8 is arranged to drive a clutch comprising a gear 10 having a portion of its periphery removed. To the gear 10 there is pivoted at 12 a lever 14 carrying a gear segment 16 which, when in operating position, is adapted to fill in the cut-out periphery of the gear 10. A restraining pin 18 is adapted to be engaged by the socket 22 of a lever 24 pivoted to the frame at 26, the arrangement being such as to rock the lever 14 against the tension of a spring 20 connected between it and a fixed pin on gear 10 in such direction as to retract the teeth of the gear segment 16 from continuity with the teeth on the gear 10 thus leaving an open space preventing mesh with pinion 8 when the machine is in rest condition.

Figure 10:
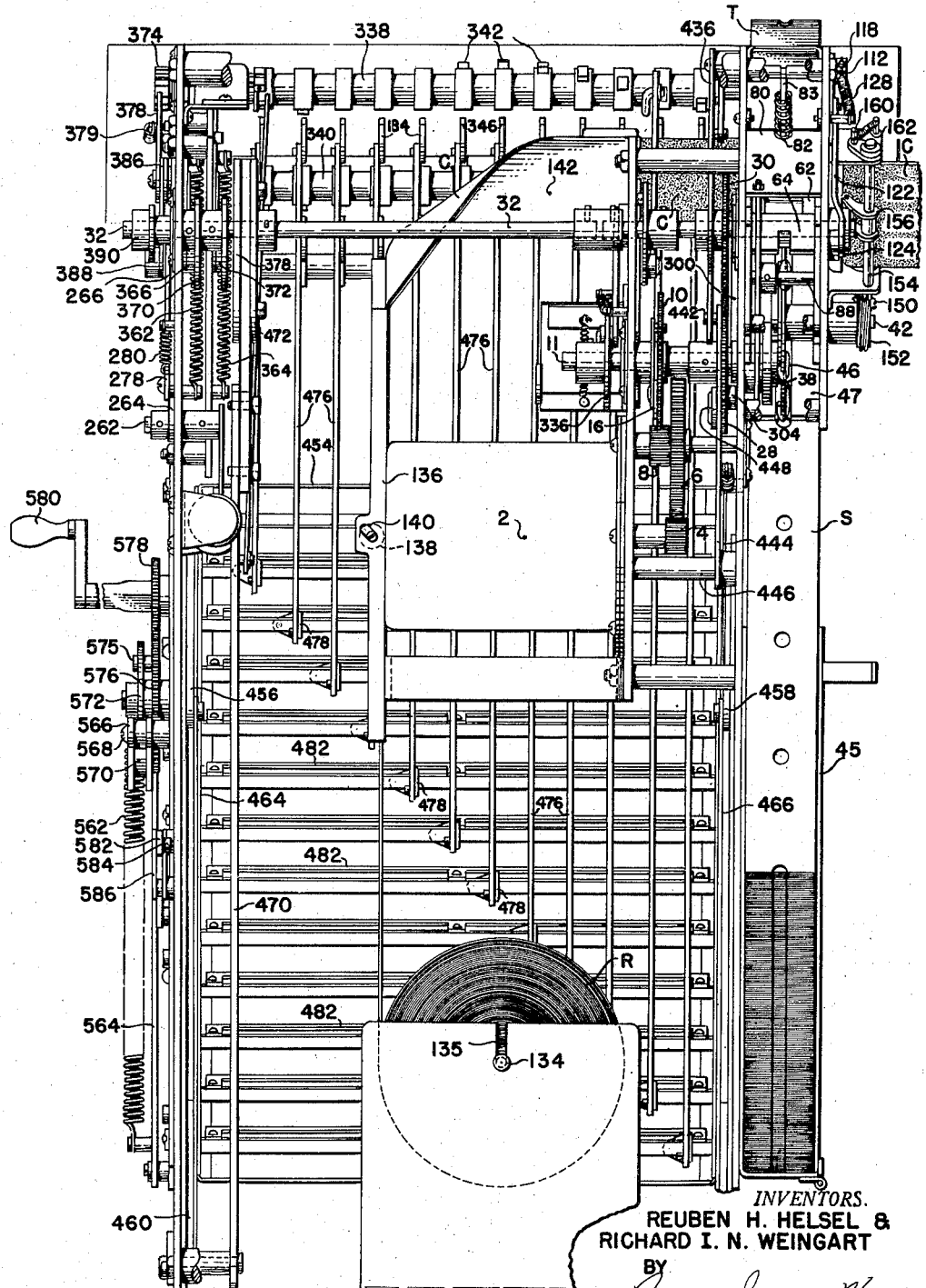
Figure 10 is a rear elevation of the operating mechanism taken from the plane indicated at 10—10 in Figure 1.

The shaft 11 to which the gear 10 is secured carries another continuous gear 28 of the same diameter which meshes with a gear 30 secured to a shaft 32 which extends completely across the machine as illustrated in Figure 10, the shaft 32 being made in connected sections for the purpose of facilitating assembly.

Figure 6:
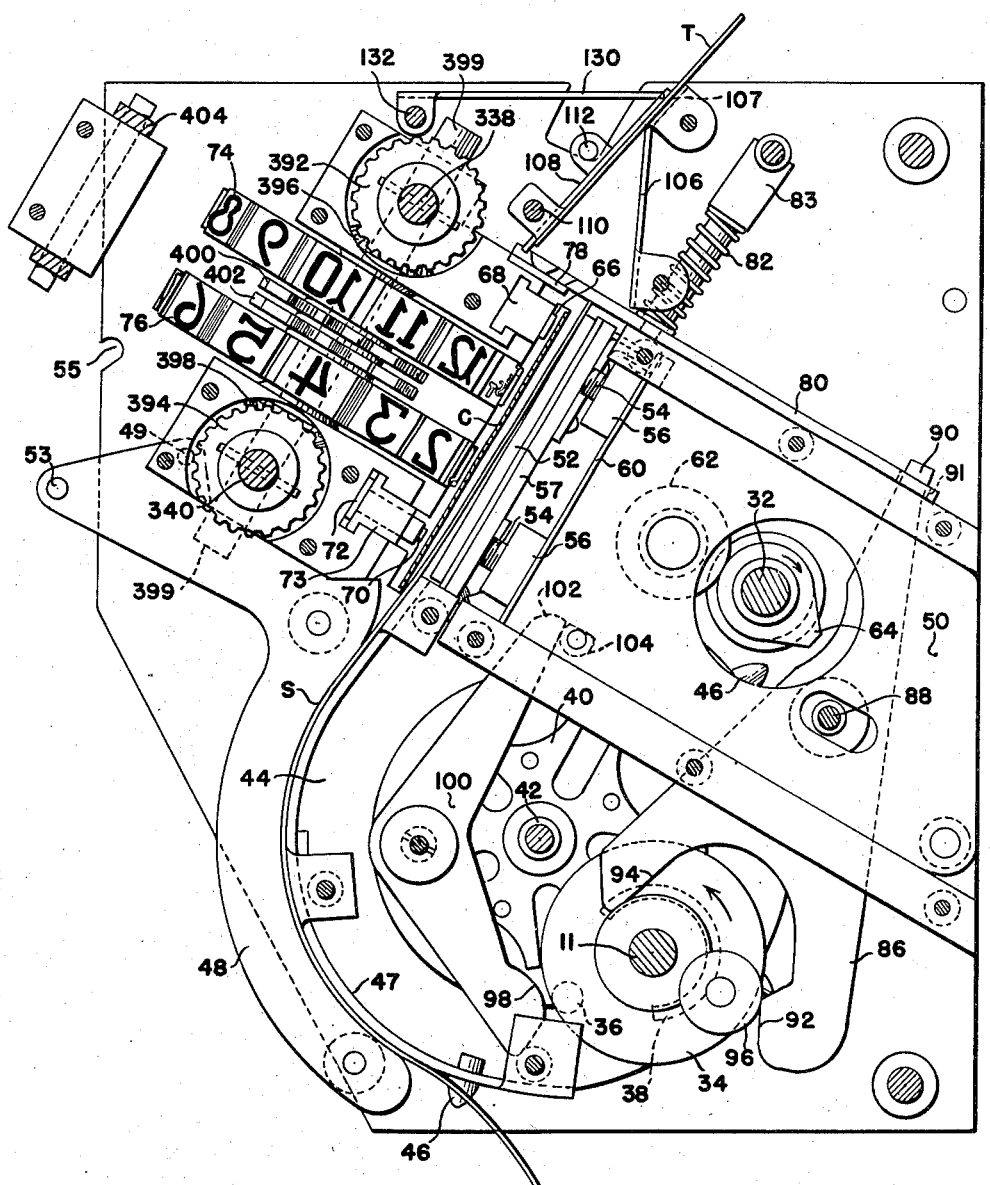
Figure 7:
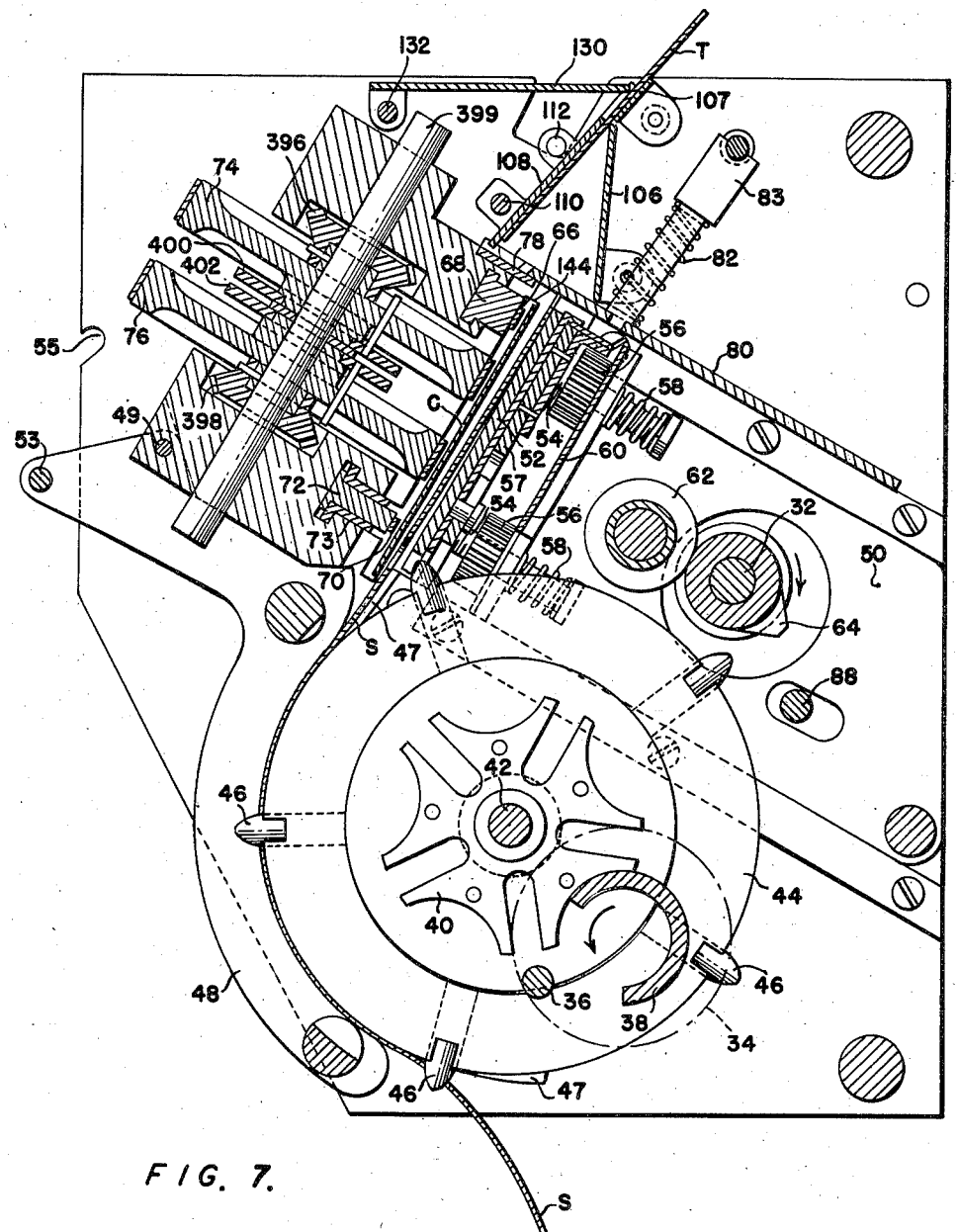

Referring now particularly to Figures 6 and 7, it will be noted that the shaft 11 carries a Geneva drive disc 34 provided with a driving pin 36 and a detent arc 38 to cooperate with the driven Geneva element 40 secured to a shaft 42. As will be evident, a complete revolution of the shaft 11 will impart to the shaft 42 a rapid motion, followed by a dwell, through a distance of one-fifth of a revolution. The shaft 42 carries a pinwheel disc 44 to which are affixed pins 46 adapted to engage central holes in the ticket strip indicated at S, a folded supply of which is located in the container 45. A guide 47 in the form of a curved plate provided with a longitudinal groove for the passage of pins 46 surrounds a portion of the periphery of pinwheel disc 44 and serves to maintain the strip S against lateral deflection. Cooperating with the guide plate 47 is the cover 48 which is pivoted at 49 to the frame. A spring 51 is anchored at one end to the frame and, at its other end, to the pin 53 carried by the cover member 48, the arrangement being such that, when the cover member 48 is swung between its closed and open positions, the spring 51 moves across the pivot point 49 so as to be effective to hold the cover plate yieldingly in either of its extreme positions. Threading of the ticket strip is facilitated by the opening of the cover plate.

A slide 50 suitably guided for longitudinal movement in the frame carries a platen 52 which is removably secured to a support 57 carrying a pair of screws 54 which project through openings in a bracket member 60 carried by the slide 50. The lower ends of the screws 54 are headed and springs 58 surrounding the screws and bearing against their heads and the bracket 60 serve to draw the platen 52 downwardly to a position which may be limited and finely adjusted by means of nuts 56 threaded on the screws 54. Inasmuch as there are four of these screw and nut combinations, it is possible to secure a fine and accurate adjustment of the platen position both in the direction of movement of the slide 50 and angularly in a universal fashion to achieve the making of good impressions by type members which will be referred to hereafter. A pair of rollers 62 are carried by the slide 50 and are adapted to be acted upon to produce printing impressions by upward movements of the slide by cam 64 carried by the shaft 32.

The printing members for the tickets include type 66 carried by a replaceable slug 68 received in a T-slot in the frame and type members 70 which are insertible replaceably with their carrying shanks 72 in openings in a second slug member 73 which is also mounted in a T-slot in the frame. Printing wheels 74 and 76, which will be hereafter described in greater detail, are also provided for selective printing on the tickets.

A fixed knife 78 mounted on the frame cooperates with a movable knife 80 for the purpose of severing tickets from the ticket strip. The knife 80 is guided by frame elements and is held in position by a strong spring 82 surrounding a pivoted pin member 83 which has a reduced end extending into an opening in the knife 80. A lever 86 pivoted at 88 to the frame has an extension 90 passing into an opening 91 in the knife 80. The lower end of the lever 86 is bifurcated to provide follower portions 92 and 94 to be acted upon by a roller 96 pivoted on the Geneva drive disc 34, the roller 96 serving to give positive movement to the lever 86 in both directions to effect cutting action and retraction of the movable knife 80. The roller 96 is also adapted to engage the end 98 of a lever 100 pivoted to the frame, this lever 100 having its upper end 102 arranged to engage an abutment 104 carried by the slide 50 to effect retraction of the platen from the ticket strip after a printing operation.

Figure 8:
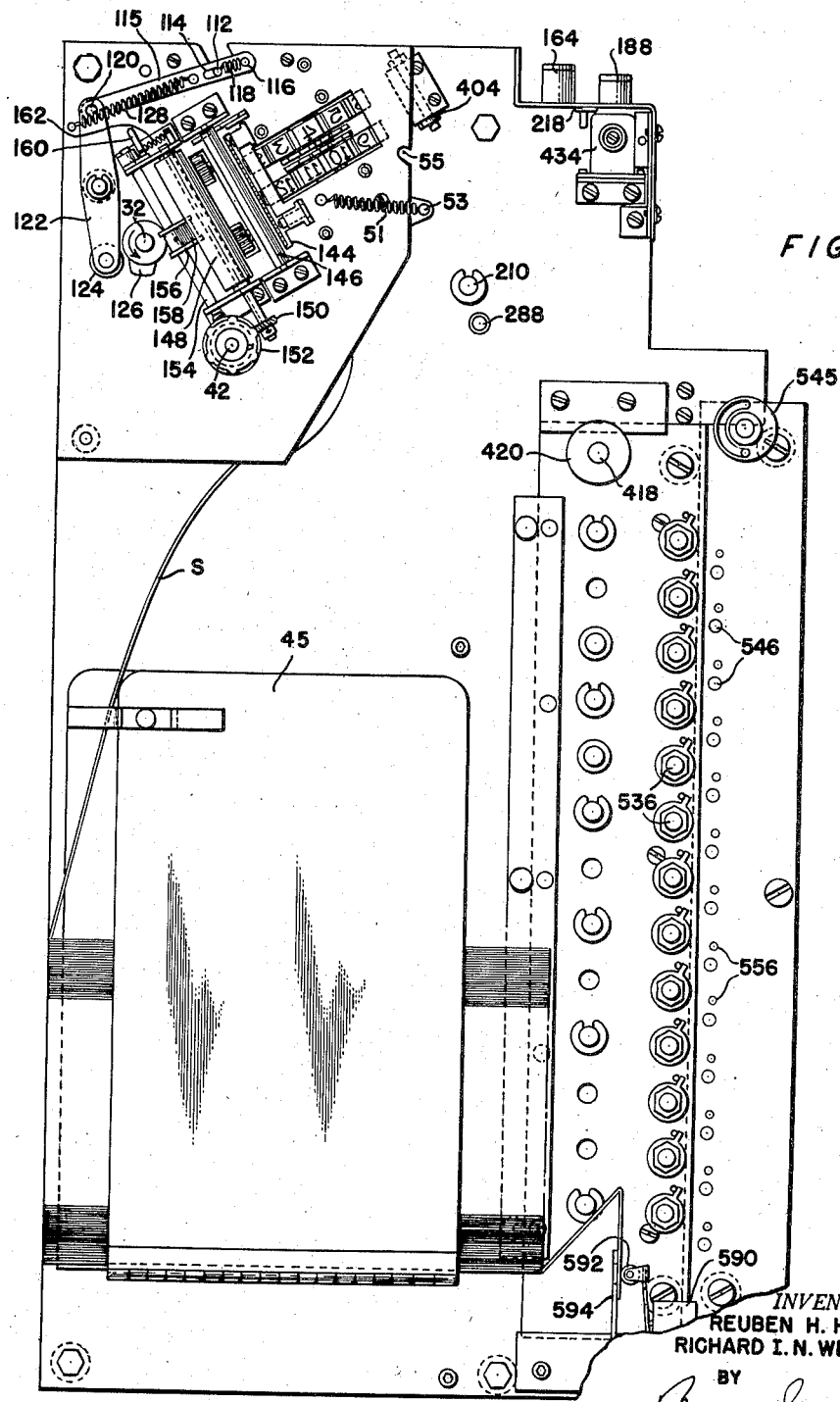

It is quite commonly necessary to issue a member of tickets to a single patron and it is desirable to issue such tickets in a single stack so that they may be conveniently simultaneously picked up and handed to the patron. For this purpose there is secured to the frame a plate member 106 provided with a flat portion 107 against which the tickets may be stacked by the action of a lever 108 pivoted at 110 to the frame and provided with a pin 112 which, as indicated particularly in Figure 8, extends within the slot 114 of a link 115, the pin 112 being connected to a pin 116 carried by the end of link 115 by means of a short spring 118. The link 115 is pivoted to the upper end of a lever 122 at 120 and this lever is provided with a follower roller 124 arranged to be acted upon by a cam 126 carried by the shaft 32. A spring 128 normally urges the link 115 in a left-hand direction as indicated in Figure 8. In order to insure proper maintenance of the tickets against too easy removal from the machine, there is provided a finger 130 pivoted at 132 to the frame and bearing against the uppermost ticket under the action of gravity, the finger 130 passing through a slot in the upper end of the lever 108.

A roll R of carbon paper C is carried by a shaft 134 which is mounted in a vertical slot 135 in each of the sides of a receptacle in the frame. The carbon paper strip passes upwardly through a guide 136 wherein it is kept from dropping under the action of gravity by a roller 138 the trunnions of which are mounted in sloping slots 140 in the guideway 136. The carbon strip passes over a plate 142 forming a continuation of the guideway 136 and thence passes between the type members and the ticket strip S to a carbon feeding arrangement which is particularly shown in Figure 8.

Figure 17:
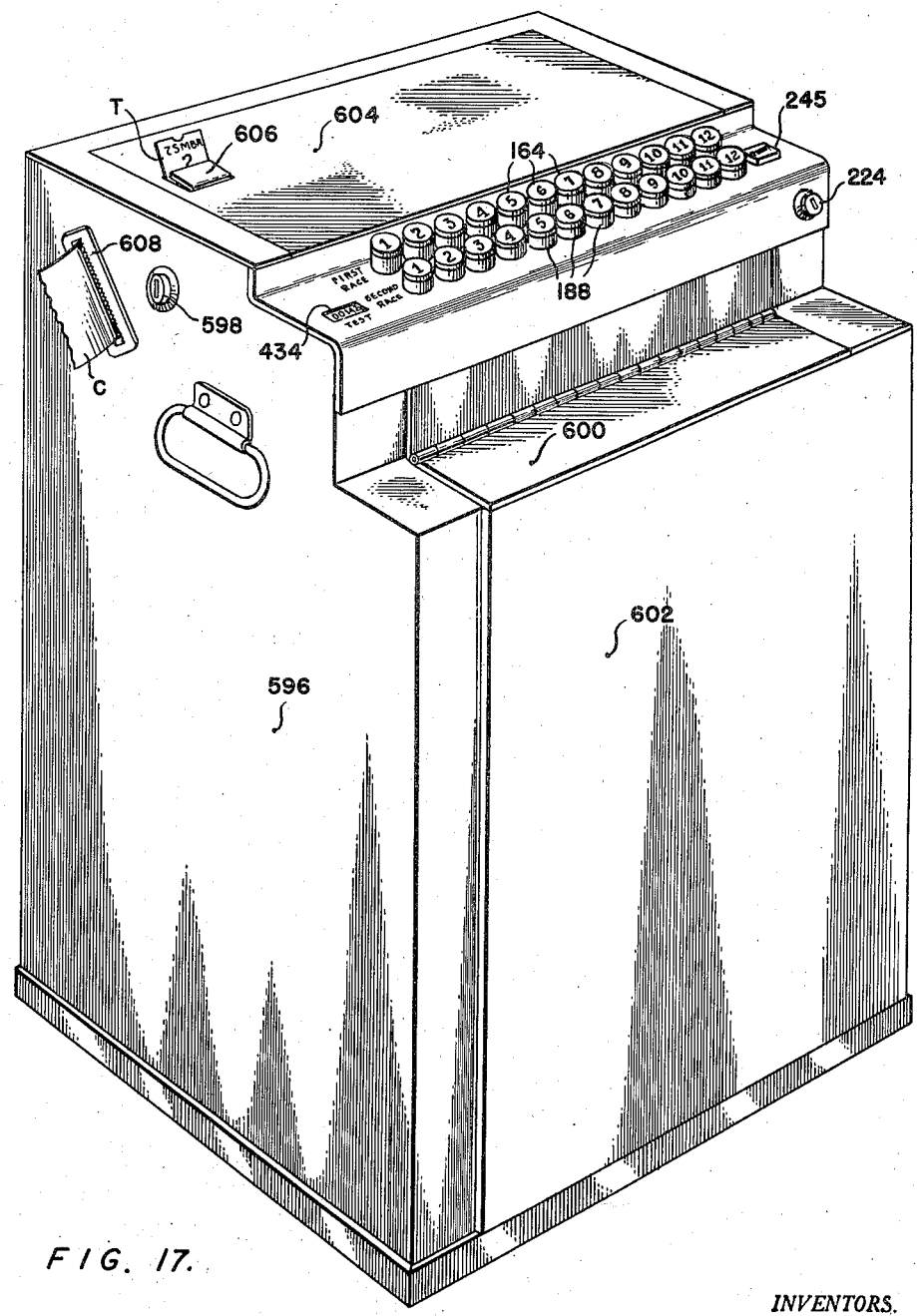
Figure 17 is a perspective showing the outer casing of the machine and indicating the emergence of a ticket and used carbon strip.

The carbon paper passes through a slot 144 in the frame and then about an idler roller 146 and between a feeding roller 148 and a serrated roller 158 carried by an arm 156 which is mounted on a shaft 154 provided at one end with a crank pin 160 acted upon by a spring 162 to bring the serrated roller into position to pinch the carbon paper against the feed roller 148. The shaft of the feed roller 148 carries a helical gear 150 which is driven by a cooperating helical gear 152 secured to the shaft 42. The arrangement just described advances the carbon paper intermittently through a small distance upon each advance of the shaft 42 so that new portions of the carbon paper are being continuously brought to printing position. The carbon paper is ultimately discharged through a slot 608 in the housing, as illustrated in Figure 17, and the used portions may be from time to time torn off.

Two banks of keys are provided indicated, respectively, at 164 and 188. Consistently with the description of the operation of the machine as a Daily Double machine, the first and upper set of keys 164 will be referred to as those for the first race and the bank of keys at 188 will be referred to as those for the second race.

The keys 164 are provided with stems 166 each of which is provided with a tail extension 168 and a socket 170, the socket being arranged to embrace a pin 172 on a member 174 which at its upper end is provided with a pin 176 riding in a slot 178 of the corresponding key stem. Each member 174 is provided with a pin 180 extending into a slot 182 of a corresponding lever 184, the levers 184 being pivoted on a common rod 186 extending transversely of the machine. Further reference to these levers 184 will be made hereafter.

Each of the keys 188 is similarly provided with a stem 190 having an extended tail portion 192 and a socket 194 embracing the pin 196 on the cooperating member 198 which, at its upper end, is provided with a pin 200 arranged to slide in a slot 202 in the key stem. Each member 198 is provided with a laterally extending pin 204 engaging within a slot 206 of a corresponding lever 208, these levers being pivoted on a rod 210 extending transversely of the machine.

The members 174 and 198 extend through slots in the edges of a plate 212 which extends across the machine and each of the members 174 and 198 is provided with a pair of shallow notches engageable with the bottoms of the slots in the plate 212. The lower ends of the members 174 and 198 are in pairs connected by springs 214 which tend to hold the notches embracing the bottoms of the slots so as to provide a yielding arrangement adapted to maintain each of the members 174 and 198 temporarily in either an upper or lower position.

Figure 4:
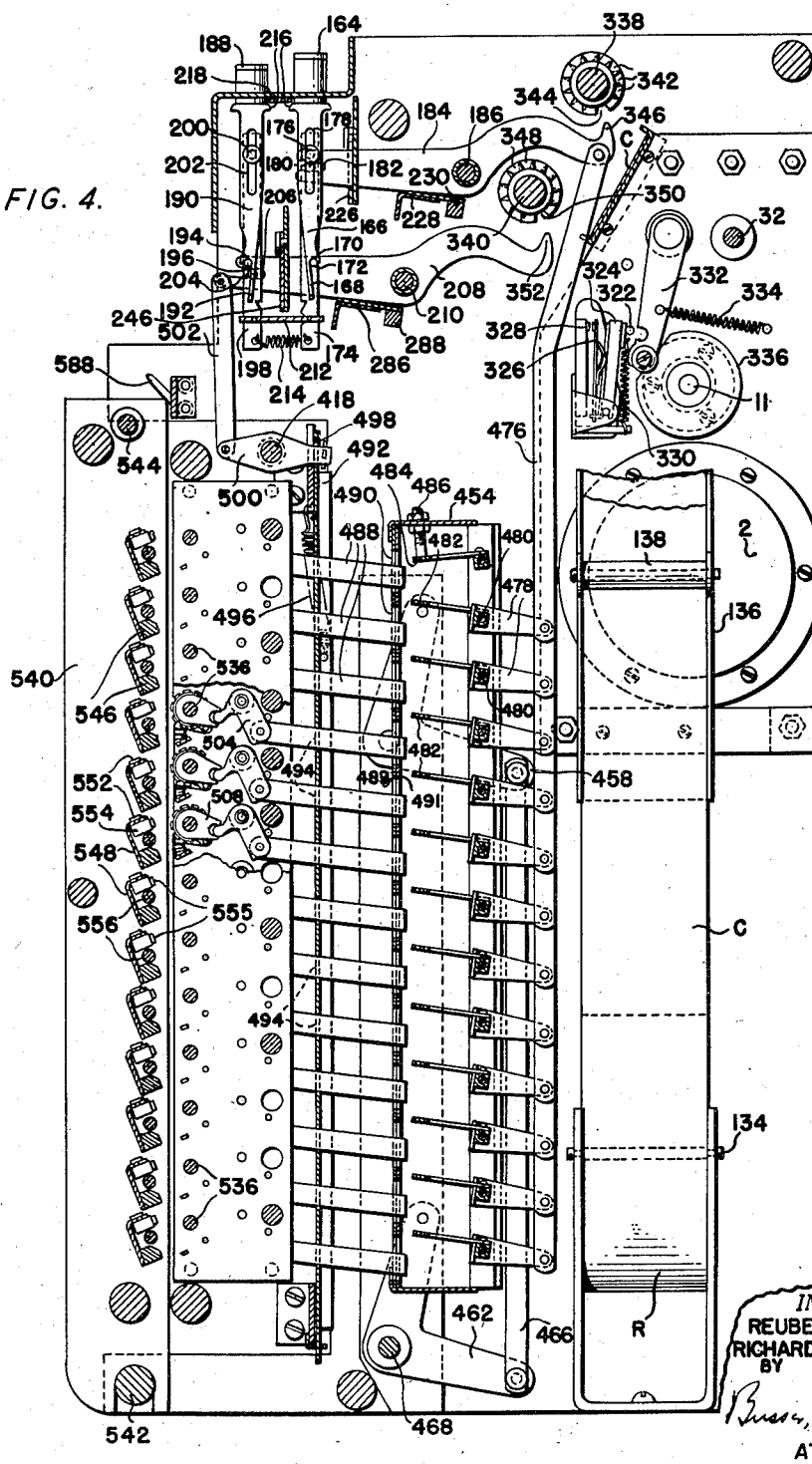

The key stems 166 and 190 are provided at their upper ends with inwardly directed extensions 216 which underlie a flat plate 218 extending transversely across the machine and provided with notches 220 for clearance of the projections 216 as indicated in Figure 1. As shown most clearly in Figure 9, the plate 218 is mounted for longitudinal sliding movement and is connected at its right-hand end to a pin 220 carried by the arm 222 of a lock 224. Under operating conditions, the plate 218 is locked so that its edge portions overlie the projections 216 of the keys of both banks to prevent these keys from being raised above the positions illustrated in Figure 4. When, however, it is desired to lock keys out of operation because they correspond, for example, to scratched contestants or bear numbers which do not correspond to contestants in the races, the plate 218 is unlocked and moved to a position in which its notches 220 are lined up with the projections 216 of the key stems. The keys which are to be taken out of operation may then be lifted to free their notches 170 or 194 from the corresponding pins 172 or 196 and may be then dropped to lowered positions so that their projections 216 are again below the level of the plate 218 which is relocked in its original position. The result is that not only are the removed keys lowered below the others so that their inoperative condition is readily apparent, but they are rendered completely inoperable to actuate the members 174 and 198 which, as will be described hereafter, must be moved to effect operation. When keys are so disengaged, the ends of their key stems are located inwardly and will rest upon the plate 212 so that the keys cannot be depressed.

Figure 9:
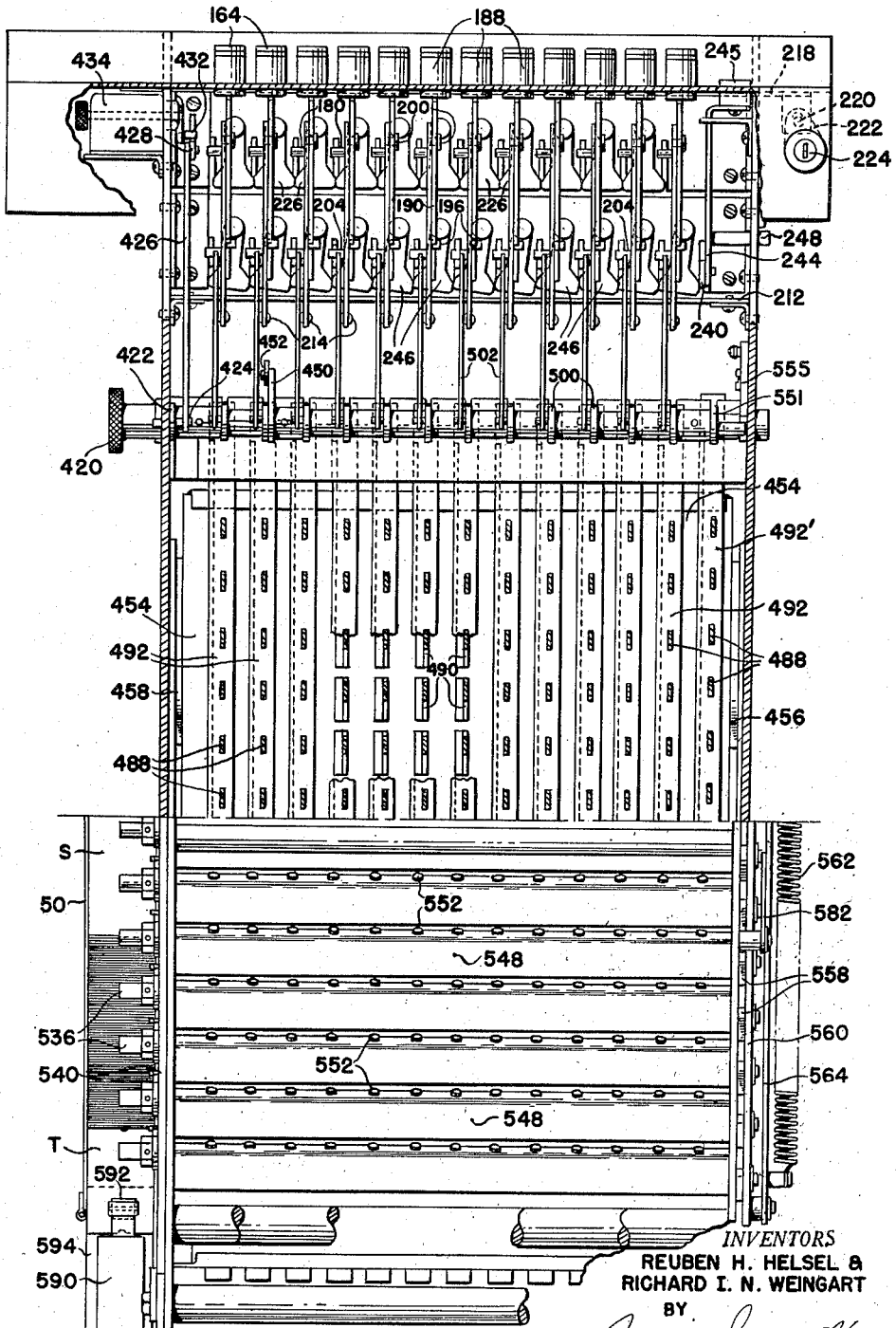
Figure 9 is a vertical section taken on the broken surface the trace of which is indicated at 9—9 in Figure 3.

Pivotally arranged between the levers 184 are rocking members 226 most clearly illustrated in Figure 9 which are of conventional type arranged in cooperation with each other and by reason of limited overall rocking movement to prevent the depression of more than one of the levers 184 at a time. This action, of course, carries through to the keys 164 so that no more than one may be depressed in an operation.

Figure 5:
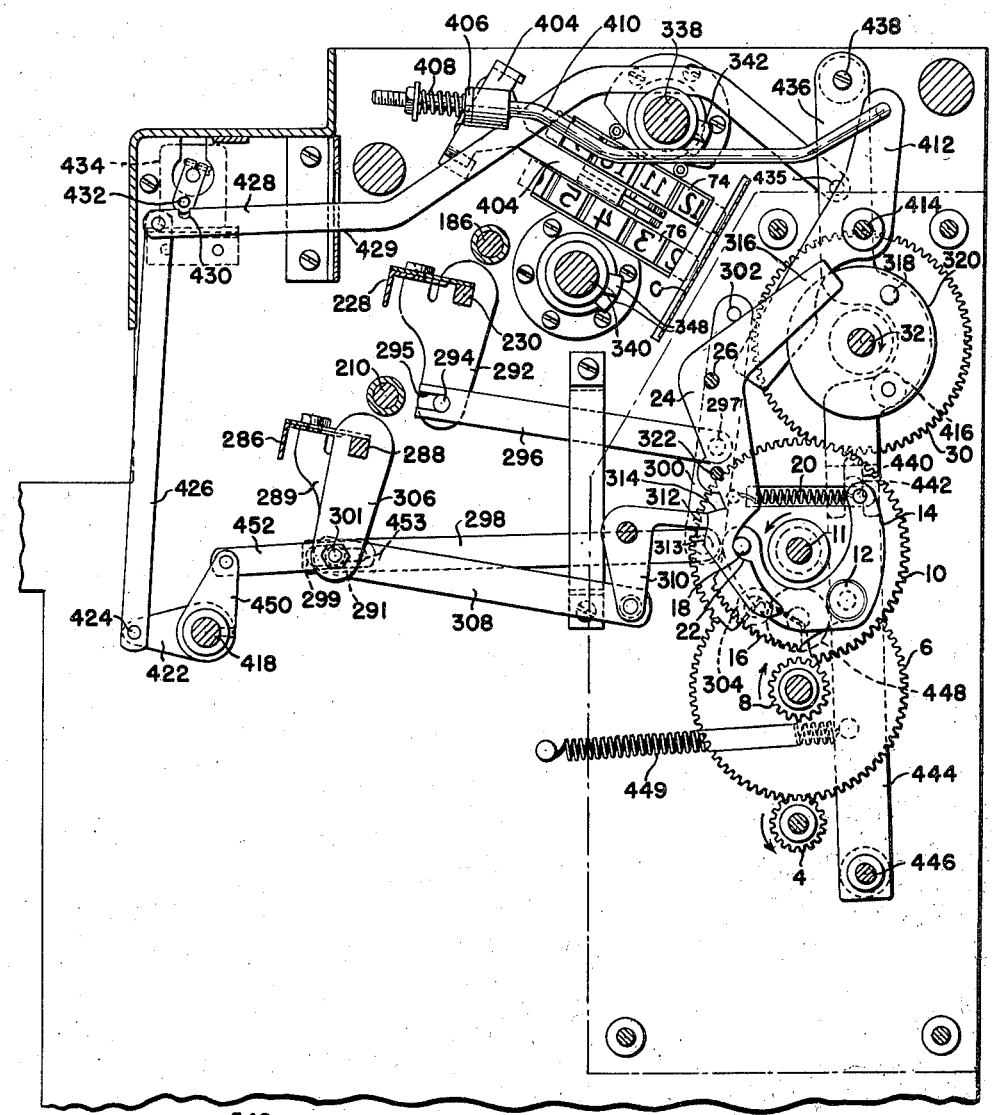

Extending below all of the levers 184 there is a plate 228 carried by a shaft 230 which, as indicated in Figure 5, is provided with an arm 292 to which further reference will be made hereafter.

Figure 3:
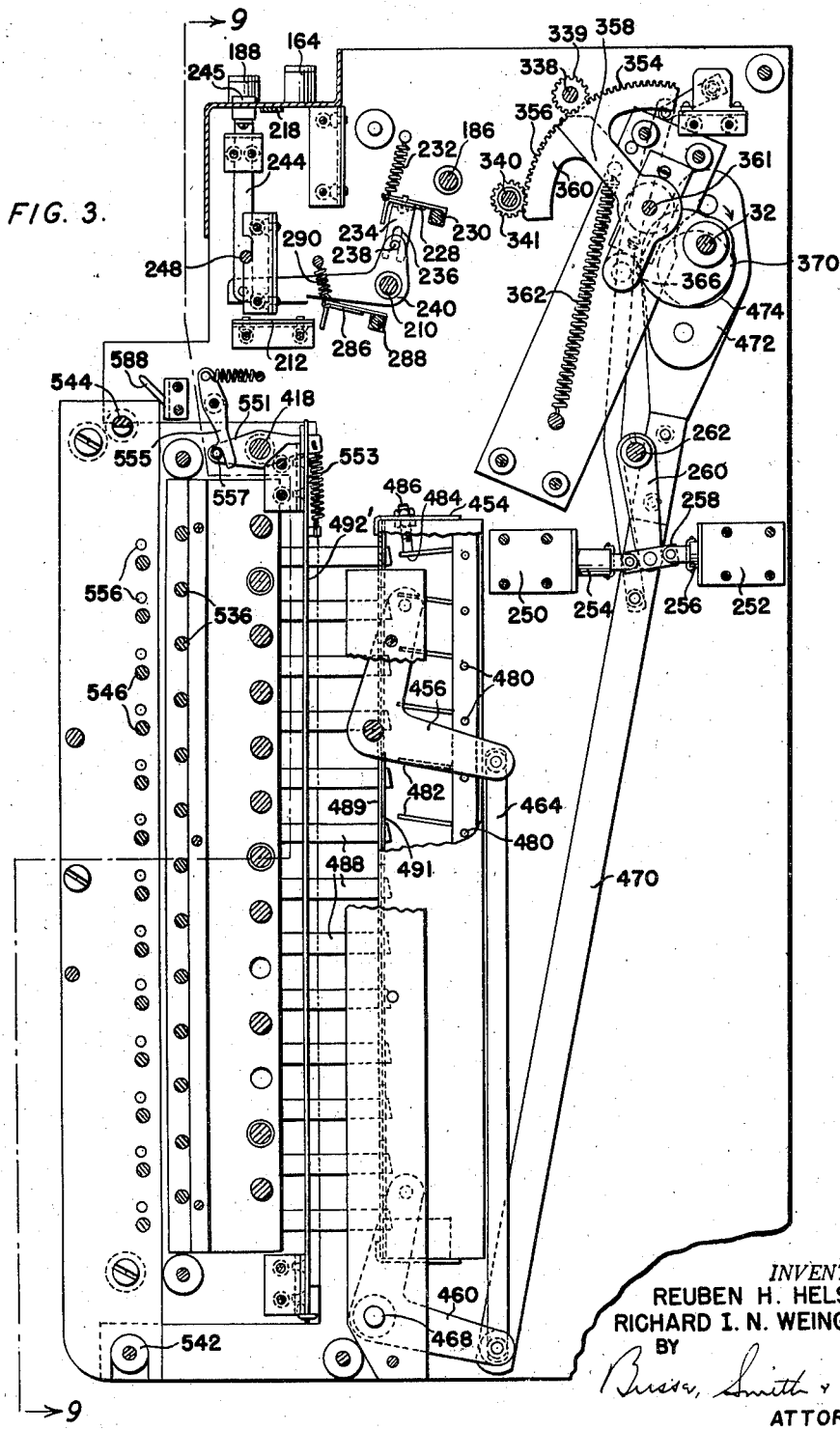

A spring 232, illustrated in Figure 3, urges the plate 228 upwardly but with insufficient force to overcome the action of the springs 214 so that it will normally not be effective to return upwardly a key which has been depressed. The plate 228 is provided with a downwardly extending portion 234 provided with a slot 236 embracing the pin 238 on a bell crank 240 which is pivoted on the rod 210 previously referred to. The forwardly extending arm of this bell crank 240 is located in a lateral path of swing of the right-hand end member 246 of a series corresponding to 226 and similarly adapted to prevent the depression of more than one of keys 188 at a time by preventing downward movement of the forward ends of levers 208.

When the machine is in its rest condition, the forward arm of bell crank 240 lies to the right of the right end pivoted element 246 because of the action of the spring 232 which lifts plate 228 when none of the keys 164 is depressed. Under these conditions, the bell crank 240 fills up all of the space so that none of the members 246 may swing and, consequently, none of the levers 208 may be depressed. However, if a key 164 is depressed, the bell crank 240 will be rocked clockwise as viewed in Figure 3, lifting its forward arm out of the path of the members 246 so that one of the levers 208 may be depressed, but no more. The arrangement, accordingly, is such that a key 188 of the second race bank may only be depressed after a key 164 of the first race bank has been depressed. The arrangement, accordingly, is such that errors are avoided in the nature of depressing first a key of the lower bank corresponding to a number of a contestant in the first race.

The bell crank 240 has a further function of permitting correction of an erroneous depression of a key 164 of the first bank. For this purpose, it is pivoted at its forward end to the stem 244 of a reset key 245. If, by the depression of a key 164, the bell crank 240 is rocked and the erroneous depression is noted, the key 245 may be pushed downwardly to effect counterclockwise rocking of the bell crank 240, as viewed in Figure 3, with the resulting upward movement of plate 228 to restore the depressed key 164 to its original position. It may be noted that similar correction for the keys of the bank for the second race is not possible since, as will be hereafter pointed out, the actuation of a key 188 initiates operation of the machine.

The link 244 forming the stem of key 245 has another function by reason of the provision of a laterally extending pin 248 carried thereby. It is desirable to provide for the locking and unlocking of a set of these machines from some central station to limit the period of time during which tickets may be sold therefrom. For this purpose, there are provided a pair of solenoids 250 and 252 which have plungers 254 and 256 connected by a link 258. Energization of the solenoid 250 effects locking of the machines of the Daily Double group while the energization of solenoid 252 effects unlocking thereof, both the locking and unlocking being under positive control through corresponding circuits running to a central office. The link 258 is connected to an arm 260 carried by a rock shaft 262 which is provided with an arm 264 to which is pivoted a link 266. This link 266 has a pin to which is anchored one end of a spring 268, the other end of which is connected to a pin 270 movable in the slotted forward end of link 266 and carried by a lever 274 pivoted to the frame at 276, the link 274 being arranged to move in the way of upward movement of the pin 248. As will become more evident hereafter, the upward movement of pin 248 is necessary for the operation of the machine since, unless it is free to move upwardly, no one of the keys 164 may be depressed due to the restraining action of plate 228 which will be held upwardly unless the pin 248 is permitted to move upwardly. As has already been described, the pin 248 will also be obliged to move upwardly before the bell crank 240 can rock clockwise, as viewed in Figure 3, to permit depression of any key 188. Accordingly, the energization of solenoid 250 by causing lever 274 to move into the path of 248 effectively results in locking of the machine. The reason for the connection of yielding nature provided by the spring 268 is to permit corrective action to occur with respect to an improperly depressed key 164 if, before correction has been effected, the solenoid 250 is energized. Under such conditions, as soon as the corrective action is effected and the pin 248 moves below the lower end of lever 274, the spring 268 will move the lever 274 into its locking position. In order to insure the yielding retention of the solenoid plungers in their proper positions, there is provided a pivoted latch 278 urged upwardly by spring 280 and provided with a projection 282 having sloping sides so that a pin 284 carried by arm 264 will be yieldingly retained either in front of or behind the projection 282 though forceful action by either of the solenoids may cause the pin to ride over projection 282 to its alternative position.

Underlying the forward ends of levers 208 there is a plate 286 mounted on the shaft 288. A spring 290, illustrated in Figure 3, normally urges the plate 286 upwardly but with insufficient force to move it if one of the levers 208 has been depressed by a key 188. Referring now particularly to Figure 5, the arm 292 carried by shaft 230 is provided with a pin 294 engaging within a slot 295 in the forward end of a link 296 which is pivoted at 297 to a lever 300 pivoted at 302 to the frame. Another link 298 also pivoted to lever 300 is provided with a slot 299 embracing a pin 291 carried by an arm 289 mounted on the shaft 288. As a result of the arrangements just described, the counterclockwise rotation of either of shafts 230 and 288 will result in swinging the lever 300 counterclockwise. This lever 300 is arranged to be acted upon by a roller 304 carried by the gear 28 so that, at a proper time during rotation of shaft 11, the lever 300 will be rocked clockwise and will forcibly rotate clockwise both of shafts 230 and 288 to return depressed keys to their uppermost positions.

A link 308 joins a pin 301 carried by a second arm 306 secured to shaft 288 to the depending arm of a bell crank 310, the horizontal arm 312 of which is arranged to engage the lever 24 referred to previously. The engagement is on a portion 313 of this lever above which there is a notch 314 into which the arm 312 may drop. The upper arm 316 of lever 24 is arranged to be acted upon by a pin 318 carried by a disc 320 secured to the shaft 32, the pin 318 serving to rock the lever 24 counterclockwise, as viewed in Figure 5.

Lever 24 is provided with a pin 322 which extends behind a pivoted switch member 324 carrying a contact 326 adapted by engagement with a contact 328 to close the circuit of motor 2. A spring 330 normally tends to open the switch. As will appear from the description of the operation, the action of pin 322 in closing the switch is temporary and does not maintain until the end of the cycle of operation. Accordingly, there is provided a lever 332 pivoted to the frame which is also adapted to engage the movable switch element 324 to effect closure of the switch, there being at the lower end of lever 332 a cam following roller engageable with the periphery of a cam 336 carried by the shaft 11. A spring 334 maintains the follower in engagement with the cam.

Extending transversely across the machine there are a pair of shafts 338 and 340. The former is provided with a series of stepped lugs 342, as indicated particularly in Figures 1 and 4. There are twelve of these lugs 342 provided in twelve of thirteen equiangularly spaced locations about the periphery of shaft 338, the position indicated at 344 being without a lug 342. Hooks 346 at the rear ends of levers 184 are adapted to be engaged by the lugs selectively as hereafter described. The shaft 340 is similarly provided with twelve lugs 348, a thirteenth position indicated at 350 being without a lug. Hooks 352 corresponding to 346 are provided at the rear ends of the levers 208.

Shaft 338 is provided with a pinion 339 at its end and shaft 340 is similarly provided with a pinion 341. These pinions are, respectively, in mesh with gear segments 354 and 356 respectively carried by arms 358 and 360. Springs 362 and 364 respectively urge the arms 358 and 360 counterclockwise about a common pivot pin 361 as indicated in Figure 3. Below the pivot pin 361 the arms are respectively provided with cam following rollers 366 and 368 engageable by cams 370 and 372 carried by the shaft 32.

The shafts 338 and 340 also carry ratchets 374 and 376 which are engageable by detents 378 and 380 under the action of springs 379 and 381. The hubs of the detents are provided with slots within which there engage pins 382 and 384 carried by the concentrically arranged hub of a lever 386 provided with a follower roller 388 engaging a cam 390 secured to the shaft 32. By the action of this cam 390 the detents are released from the ratchets against the tensions of their respective springs at proper times.

At their left-hand ends the shafts 338 and 340 are provided with bevel gears 392 and 394 which mesh, respectively, with bevel gears 396 and 398 secured to the printing wheels 74 and 76, previously mentioned, which are freely journalled upon a fixed shaft 399. Also secured to the printing wheels 74 and 76 are star members 400 and 402. Within the notches in these members there is engageable for angular alignment purposes the end of a lever 404 which is pivoted to the frame and provided with an arm 406 on which bears a spring 408 carried by a rod 410 which is linked to a lever 412 pivoted to the frame at 414 and having its depending portion engageable by a roller 416 carried by the disc 320 secured to shaft 32.

A shaft 418 extending across the machine is provided with a knob 420 by which it may be manually rocked, the knob being hereinafter referred to as the test knob since, as will appear hereafter, its partial rotation effects the issuance of a ticket to test the operation of the machine. To the shaft 418 there is secured an arm 422 which is connected at 424 to an upright link 426 which, in turn, is connected to a link 428 the forward end of which is guided in a slot 429 in the machine frame. The forward end of this link 428 is provided with a notch 430 which, when the link 428 is raised, embraces a pin 432 carried by the operating arm of a counter 434 which registers the number of test tickets which may be issued. The rear end of link 428 is pivoted at 435 to a depending lever 436 pivoted at 438 to the frame and provided at its lower end with a slot 440 within which there engages a pin 442 carried by a second lever 444 pivoted at 446 to the frame and arranged to be rocked by the action of a roller 448 carried by the gear 28. A spring 449 normally urges the lever 444 in a counterclockwise direction opposing the action of roller 448.

Also secured to the shaft 418 is an arm 450 which is connected by link 452 to the pin 301 carried by the arm 306 mentioned previously, a slot 453 in the link embracing the pin 301.

A frame, indicated at 454, is mounted for forward and rearward motion by pivotal connection to the upper ends of bell cranks 456, 458, 460 and 462 which are mounted in the machine frame, the bell cranks 460 and 462 being joined by a shaft 468, while the bell cranks 456 and 460 are joined by a vertical link 464, the bell cranks 458 and 462 being similarly joined by a vertical link 466. The bell crank 460 is connected by a link 470 to an eccentric strap 472 which embraces an eccentric 474 on the shaft 32.

Each of the levers 184 is connected by an individual link 476 to an arm 478 which is respectively carried by a shaft 480, there being carried by each of the shafts 480 a plate 482, the shafts 480 being mounted in the frame 454. Besides the twelve plates 482 which are thus individually associated with levers 184 there is an upper plate 484 which is held in fixed position by a screw and nut arrangement indicated at 486. A pair of flatwise related plates 489 and 491 form part of the frame 454 and are provided with aligned slots 490 arranged vertically. Extending through these slots are links 488 which, as will presently be described, serve for the operation of numbering heads. These links 488 are provided with turned rear ends and it is for the ready assembly of these that the two plates 489 and 491 are provided, these plates being provided with horizontally elongated slots for the passage of the turned ends of the links, the plates being then moved in assembly so that the overlapping portions of their slots provide laterally thin guiding slots for the passage of the links. The links 488 also pass through vertically elongated slots in twelve upright members 492. The slots in these members are of a height corresponding to the height of the links with slight sliding clearance, whereas the slots at 490 are of substantially greater height so as to permit upward and downward movements of the links. Individual springs 496 tend to move upwardly the members 492 which are guided for vertical movements in the frame. At its upper end, each of the members 492 is provided with an opening 498 through which there projects one end of an individual lever 500 connected through a link 502 to a corresponding one of levers 208. The levers 500 are journalled for free rocking movement on the shaft 418, being maintained properly located by means of spacers surrounding the shaft. At the extreme right-hand end of the machine there is another member 492' generally similar to the members 492 except for the fact that it is urged upwardly by a spring 553 connected to one end of a lever 551 which is secured to the shaft 418. The rear end of lever 551 extends through an opening in a member 492'. The lever 551 is provided with a pin 557 which is engageable alternatively above or below a projection on a spring-controlled detent lever 555.

Reference may now be made particularly to Figure 11 to 15, inclusive. The forward ends of the links 488 are pivoted to bell cranks 504 which are provided with rounded end portions 506 arranged for engagement in corresponding slots in the ends of operating levers 508 for numbering heads. These numbering heads are of generally conventional type but they will be described in some detail in view of the fact that they are resettable in this machine. Each lever 508 is arranged to produce oscillation of a frame 510 to which is pivoted by a pin 518 a member 517 which is provided with a series of pawl projections 512, 514 and 516 of successively reduced inward projection. A suitable spring 519 urges the member 517 inwardly so that the pawl portions thereof may properly engage the ratchet wheels 520, 522 and 524 respectively connected to the number printing wheels 526, 528 and 530. The arrangement is such as to provide for carrying from each order to the next higher order by reason of a special depression permitting the member 517 to drop inwardly to provide pawl engagement with the ratchet of the next higher order when, in a particular order, a transition occurs from nine to zero. The action in this respect will be evident from Figures 13, 14 and 15. Friction arms 534 are provided to prevent overrun and detents 532 are provided to prevent retrograde movements of the numbering wheels. The wheels are mounted on shafts 536 which extend through all of the numbering heads of a particular row, the shafts 536 being rotatable to zeroize the counters through the medium of slots in the shafts engaging pawls 538 in the wheels.

There are in the array of numbering heads a total of 1699 heads. Those heads which correspond to horizontal alignment of plates 482 and those links 488 which extend through members 492 serve for the counting of tickets corresponding to each of the 144 combinations of the twelve contestants in the first race with the twelve in the second race. Those numbering heads which correspond to the horizontal alignment of the plate 484 and the topmost links 488 which extend through members 492 serve for the counting of the totals of those tickets which are issued to include the several contestants in the second race, there being twelve of such numbering heads.

The numbering heads which are in front of the member 492' and which are actuated by the links 488 extending through this member by cooperation of the links with plates 482 serve for the registering of the total number of tickets issued involving the various contestants in the first race. There are twelve of these heads.

The remaining numbering head which is at the extreme upper right of the machine corresponds to the alignment of the plate 484 with the uppermost link 488 extending through member 492' and serves for registering the total number of all tickets issued by the machine under control of the keys 164 and 188. The particular fashions in which these various registrations are secured will become clear hereafter in consideration of the operation of the machine.

A frame 540 is pivoted at 542 to the frame of the machine and is adapted to be latched in position by a rotatable semi-circular latching element indicated at 544, the arrangement being such that, whenever desired, the frame 540 may be swung outwardly to an extent permitted by engagement of a pin 584 with a guide member 586 carried by the machine frame, the pin 584 being carried by a link 582 pivoted to the frame 540. Horizontally extending shafts 546 are provided with arms 558 which are pivoted to a common link 560 which is urged upwardly by a powerful spring 562. The shafts 546 carry angle members 548 in rearwardly elongated openings 549 in the generally horizontally portions of which there fit loosely headed pins 552 secured to hammer members 554 which are faced with suitable impact material 555 to hammer an assembly of record sheets and carbon papers against the printing numeral faces of the numbering heads. Pins 556 extend across the machine in such fashion as to limit the rearward movement of the members 548 with the result that the hammer elements 554 may overrun and produce an impression. To provide for operation, a link 564 is pivoted to the lower end of link 560 and to the end of a lever 566 which is pivoted at 568 and provided with a cam follower 570 engageable by a cam 572. The cam 572 is arranged to provide a sharp drop of the roller 570 from its high point and to this end it is journalled on the shaft of a gear 576 and is provided with a slot 574 receiving a pin 575 carried by the gear. The arrangement is such that, as the gear is rotated in a counterclockwise direction by reason of the manual drive of the meshing pinion 578 by a hand crank 580, friction of the roller 570 on the surface of cam 572 causes the cam to lag the advance of gear 576. However, as soon as the cam passes the high point of the roller 570, the roller, due to the action of spring 562, will rotate the cam itself in the direction of movement of gear 576 so that the roller will very quickly clear the high point of the cam and drop to its low point. Thus, a rapid snap action is effected. In order to insure a definite rest position of the cam there is provided in its periphery a notch 573 receiving the roller 570 thus providing a yielding detent.

A series of hooks 588 receivable in openings in record sheets and interposed carbon sheets serve for the support of these sheets in a stack in front of the numbering heads and behind the hammers 550 when the frame member 540 is in its closed and latched position.

In order to indicate the approaching exhaustion of the ticket supply, there is provided a switch 590 having an arm 592 which bears against the last ticket of the supply pinching it against a plate 594 having an opening into which the feeler roller of the switch may drop. Various alternatives may be used: the switch 590 may be arranged to operate a signal, or may be in series in the motor circuit so that, when opened by exhaustion of the supply, it will prevent operation of the motor. Alternatively, it may lock the machine by serving to energize the solenoid 250 when the supply is exhausted.

Figure 16:
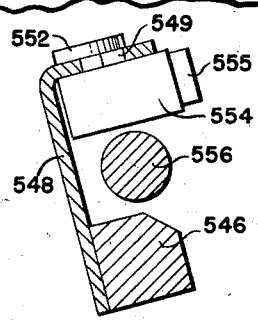
Figure 16 is a fragmentary sectional view showing details of a printing hammer and its mounting.

Referring to Figure 16, there is indicated therein the cover housing for the mechanism which has been described. This may include a side plate 596 locked in position by a suitable lock 598 so that when removed it will afford access to the interior of the machine particularly for the purpose of threading the ticket strip and the carbon paper. Removal of this cover also exposes the test knob 420 and permits access to the shafts 536 for the resetting of the counters. The crank 580 has access to the shaft of the pinion 578 through an opening in the other side of the machine which is not specially illustrated. A cover 600 may be raised to give access to the recording apparatus consisting of the numbering heads and the hammer arrangement. The frame previously designated 540 may be connected to a front plate 602 which provides a front cover. A removable top plate 604 provides access to the upper portions of the machine. The tickets T are issued through an opening provided with a conventional hinged cover 606. The opening 608 in the side cover plate 596 serves for the egress of the carbon paper strip which may be torn off as it accumulates.

Before proceeding with a description of the operation of the machine, reference will be made to the nature of the tickets issued and to the records of operations which are produced.

Figures 18, 19:
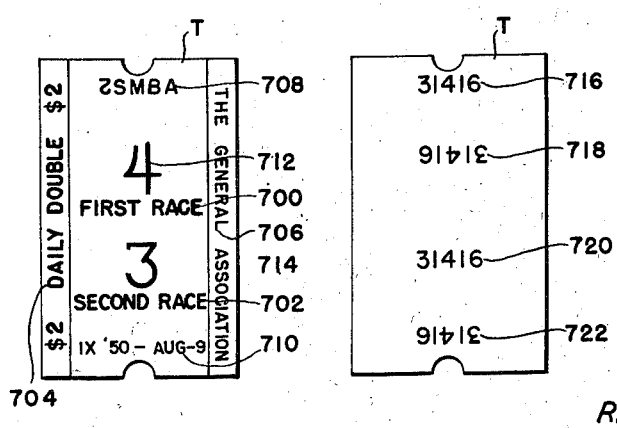
Figure 18 is a view showing the face of a ticket issued by the machine.
Figure 19 is a rear view of the same ticket.
Figure 2:
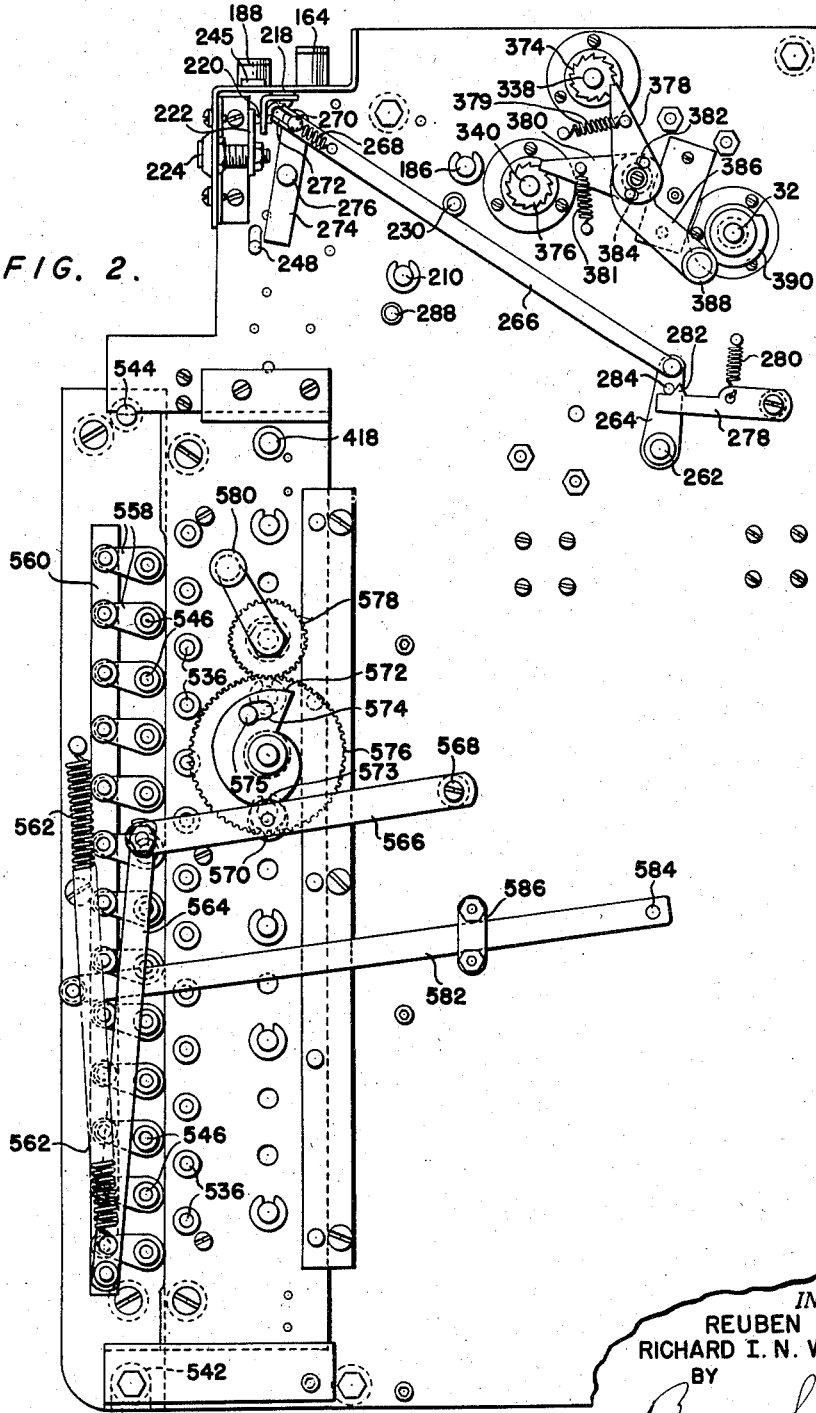
Figures 2, 3, 4, 5, 6, 7 and 8 are, respectively, vertical sections taken on the planes or broken surfaces correspondingly designated as 2—2, 3—3, 4—4, 5—5, 6—6, 7—7 and 8—8 in Figure 1.

Figures 18 and 19, respectively, show the face and rear of a ticket T such as would be issued for the fourth contestant in the first race and the third contestant in the second race. The face of the ticket may contain such preprinted matter as the race designations at 700 and 702, the value and type of the ticket as at 704 and the designation of the track as at 706. The paper used may be of safety stock to minimize the possibility of alterations and may, if desired, carry other preprinted matter on its face.

A code designation changed from day to day is indicated at 708 and is printed by the type 66 of the slug 68 previously referred to.

At 710 there is indicated the matter printed by the type 70 of the slug assembly 73. This may comprise a designation of the machine and the date or other matter, if desired, which may vary from time to time.

The contestants of the respective first and second races have their numbers printed at 712 and 714 by the printing wheels 74 and 76. While, for simplicity, these wheels are indicated as printing relatively simple numbers, the particular printing faces may print the numbers in unusual fashions so as to make especially difficult attempts at modification.

The back of the ticket is illustrated in Figure 18 and comprises, as shown, the serial number of the ticket repeated four times and in such fashion that the first and third reproductions at 716 and 720 are upright while the second and fourth reproductions at 718 and 722 are inverted. The reason for this arrangement is that because of the inversions at 718 and 720, in particular, it becomes very difficult to form a fraudulent ticket by taking the machine-printed number from the second race and substituting it for the machine-printed number for a first race to secure a winning combination.

The record sheet or sheets made by the machine are illustrated in Figure 20. The main record sheet is indicated at 724 and, since, normally, it would be desirable to make at least one duplicate, there is indicated at 725 a carbon sheet for securing impressions on the first sheet 724, and a second carbon 726 for making the duplicate at 728. All of these sheets are provided with holes 738 for mounting them on the hooks 588.

The record sheets may be preprinted with rows and columns, the rows being numbered at 730 to correspond to contestants in the first race and the columns numbered at 732 to designate contestants in the second race. At 738 there are printed in the blocks formed by the intersecting rows and columns the total numbers of tickets indicated by the printing heads for the particular combinations of contestants represented by the intersection.

In a thirteenth column there are printed at 740 the numbers corresponding to the total numbers of tickets issued involving each contestant in the first race. Similarly, in a thirteenth row there are printed at 742 the total number of tickets issued corresponding to each of the contestants in the second race.

At 744, in a block constituting the intersection of the thirteenth row and thirteenth column, there is printed the total of all tickets issued. As will be evident, the total at 744 should be the sum of the numbers in both the thirteenth row and the thirteenth column and a check on the existence of such condition affords an excellent check on the proper operation and recording effected by the machine since even compensating errors which might occur to make the sums of the individual rows and columns correct would, nevertheless, not be likely to be cross-compensated to the extent that the figures in the thirteenth row and thirteenth column would add up to the same proper total. As will be more evident from the description of the operation hereafter, the check on accuracy thus afforded can, for all practical purposes, be considered absolute since the improbability that numerical consistency of the record sheet would result when there is some error in operation is extremely small.

The machine, when ready for the issuance of tickets, will have its parts in the positions illustrated in the various figures which are consistent in showing the parts in their initial positions. The solenoid 252 will be energized so that the pin 248 will lie to the left of the latching projection 282 with the result that the locking lever 274 will be clear of the path of the pin 248. If, on the other hand, the solenoid 250 had been last energized, the lever 274 would overlie pin 248 with the result, which will become more apparent hereafter, that depression of any of the keys would be prevented.

The initial step in operation involves the depression of one of the keys 164 corresponding to the number of the chosen contestant in the first race. Depression of a key 188 would, at this time, be prevented in view of the fact that there would be no free space for the swinging of any of the rockers 146 inasmuch as lever 240 would be in its counterclockwise position.

The key 164 which is pedressed is latched in its lowered position by engagement of the upper notch of its corresponding element 174 with the edge of plate 112 under the action of spring 214. The depression of a key rocks its corresponding lever 184 which by filling up the free space of normal movement of rockers 266 prevents the depression of another key 164. The nose 346 of lever 184 is positioned in the path of a corresponding lug 342 on shaft 338. The rocking of lever 184 also rocks the plate 288 and shaft 230 and through this shaft arm 292 is rocked so that pin 294 moves rearwardly the link 296 to correspondingly rock the lever 300. Link 298 is at this time pulled rearwardly but without action on the lever 289 because of the forward extension of slot 299 beyond the pin 291.

The rocking of shaft 230 additionally rocks the lever 240 clockwise, as viewed in Figure 3, causing it to clear the path of the rockers 246 so as to make possible the depression of a key 188. The reset button 245 is raised. It may be noted that, if, after the occurrences just mentioned, the reset button 245 is depressed, all of the parts would be restored to their initial positions so that a correction of an improper depression of a key 164 may be made.

The counterclockwise rocking of a lever 184 referred to above causes, through the corresponding link 476, the downward movement of one of the plates 482 which corresponds to the row of numbering heads representing the chosen contestant in the first race.

Following the above preliminary setting up of parts by depression of a key 164 there is then depressed a key 188 corresponding in number to the second race contestant chosen for the combination. The depressed key 188 is latched down by engagement of the upper notch of its element 198 with the plate 212 under the action of a spring 214. The key depression rocks lever 208 counterclockwise and this fills up the space for free movement of rockers 246 so as to prevent the depression of a second key 188.

Th rocking of a lever 208 brings its nose 352 in line with a corresponding lug 348 on shaft 340. Through its connection with a link 502 and a rocker arm 500 the lever 208 also raises the corresponding slide member 492 to raise all of the links in the column which corresponds to the selected contestant in the second race. It will now be evident that among the links 488 corresponding to contestant columns and plates 482 corresponding to contestant rows there will be brought into horizontal alignment only one of the links 488 and only one of the plates 482, this alignment being representative of the combination of the chosen contestants in the two races.

The rocked lever 208 acts on plate 286 and its shaft 288 effecting rocking of the arms 289 and 306. The rocking of the former is without action at this time inasmuch as the pin 291 will have already been cleared by the right-hand end of slot 299 due to the previous rearward motion of link 298. The pin 301 will ride toward the rear of the slot 453 in link 452 without moving the link. The pin 301, however, will through the link 308 rock the lever 310 to initiate power operation.

As lever 310 rocks counterclockwise, its end 312 will clear the surface 313 of lever 24 and will move into alignment with the notch 314 so that the lever 24 is free to move clockwise as viewed in Figure 5. Such action occurs because of spring 20 acting on lever 14 which carires pin 18 engaging lever 24. Under this spring action, the pin 322 engages the movable switch member 324 closing the switch to energize the motor 2. At the same time, the gear segment 16 is rocked outwardly to a position to mesh with pinion 8. The result, accordingly, is to initiate counterclockwise rotation of shaft 11 and clockwise rotation of shaft 32 as viewed in Figure 5.

Reference will first be made to the operations involved in the printing, issuing and severance of a ticket during the cycle of operation which encompasses one complete revolution of each of shafts 11 and 32.

Referring to Figure 3, it will be noted that in a previous cycle the cams 370 and 372 will have rocked the gear segments 354 and 356 against the actions of springs 362 and 364 to their extreme positions. During this action the detents 378 and 380 will have been in operative positions but the teeth of ratchets 374 and 376 will have clicked passed them during the setting operation. It may be remarked that these detents are provided only to avoid possible noisy impacts of parts at a later stage of the operation.

The first portion of the motion of shaft 32 from its initial position effects release of the detents 378 and 380 by the action of cam 390 on roller 388. Though the detents are then released, there will occur no motion of the gear segments 354 and 356 inasmuch as they still follow high portions of the driving cams. As rotation proceeds, the gear segments 354 and 356 are gradually released with the result that their actuating springs cause rotation of shafts 338 and 340 in clockwise direction until lugs 342 and 348, which correspond to the depressed keys, are arrested by the projections 346 and 352 of the respective levers 184 and 208. The rotations of shafts 338 and 340 set up the printing wheels 74 and 76 to bring into printing position the numbers corresponding to the selected contestants. Following such rotation of shaft 32 as will permit, if necessary, complete movements of shafts 338 and 340, roller 416 will engage lever 412 to cause the detent 404 under the action of spring 408 to engage the star wheels 400 and 402 to insure proper alignment of the selected number printing faces in the printing position.

Immediately following this, the cam 64 on shaft 32 engages roller 62 to provide a printing impact by the platen to effect printing by the wheels 74 and 76 and by the slug faces 66 and 70. It should be remarked that, actually, a complete revolution of shaft 32 and a complete cycle of operation takes place in a very short time so that cam 64 is actually travelling quite rapidly at the time the printing action is effected with a resultant sharp printing impact rather than any gradually and slowly applied pressure.

Roller 96 will, at about the same time, engage the arm 94 of lever 86 to withdraw the movable knife blade 80 from the fixed blade 78 so as to open a path for the projection of the ticket. The spring 82 and its mounting will, in this operation, move across a dead center position so that the movable blade 80 will be held definitely but yieldingly in open position after that position is attained. Shortly after withdrawal of the knife, the roller 96 will engage the end 98 of lever 100 to effect positive withdrawal of the platen so that it will not interfere with free movement of the ticket strip.

The cam 126 on shaft 32 will act on lever 122 to effect through the action of spring 118 a release and lifting of the ticket clamping member 108. If a ticket remains in projected position from a previous cycle, it will be held under light pressure by the member 130 against the portion 107 of the fixed member 106. While frictionally held by member 130 it may, nevertheless, be readily lifted by the advancing end of the ticket strip while, at the same time, the friction between member 130 and the previous ticket will prevent that ticket from being ejected.

The feeding of the ticket strip then occurs by the action of pin 36 on the driven element 40 of the Geneva mechanism. A quick advance is imparted to the ticket strip by the pinwheel causing its leading end to ride along the surface of element 106 moving it upwardly between a previous ticket, if present, and the surface of 107.

At practically the end of rotation of shaft 11, roller 96 engages arm 92 of lever 86 to advance the movable knife to effect cutting off of the issued ticket.

It may be here noted that at the time of advance of the ticket strip by the pinwheel, the carbon strip is given a small advancing movement.

Reference may now be made to the operations involved in recording the number of tickets of each combination issued. It has already been pointed out that of the links 488 and plates 482 there will have been achieved a horizontal alignment of one pair corresponding to the combination of contestants chosen. It may now be further pointed out that, in the column corresponding to the second race contestant, the uppermost link 488 will be raised into horizontal alignment with the permanently depressed plate 484. Consequently, there will be operated in the uppermost row of numbering heads that one which is in the column of the second race contestant.

It may also be noted that the links 488 in the extreme right-hand column will now be in raised position by reason of the raised position of the guiding member 492' (Figure 3). Consequently, of the right-hand column of numbering heads that one will be actuated which is in a row corresponding to the first race contestant.

In short, the uppermost row of numbering heads and the right-hand column of numbering heads are operated to accumulate, respectively, the total numbers of tickets issued involving each second race contestant in the form of sub-totals. The exception to this is the counter at the extreme upper right-hand corner of the array. It will be evident that this counter is operated upon the issuance of all tickets except test tickets by reason of the horizontal alignment of the permanently lowered plate 484 with the permanently raised uppermost link 488 in the right-hand column.

Referring to Figure 3 it will be noted that the eccentric 474 is in approximately dead center position at the beginning of the cycle with the result that during the first half of the cycle the link 470 will rock the frame 454 forwardly producing advance of the several counters, as just described, which involve horizontal alignment between plates 482 and 484 and links 488. Through the remaining half of the cycle withdrawal of the frame occurs so as to clear the parts from each other for reselection in the next cycle.

There may now be considered the termination of the cycle of operation. In the latter part of the cycle the pin 318 will engage the arm 316 of lever 24 rocking this lever counterclockwise so as to bring surface 313 clear of the end 314 of lever 310. Roller 304 engages lever 300 rocking it to the left, as viewed in Figure 5, and causing plates 228 and 286 ot be rocked upwardly to raise levers 184 and 208 and the depressed keys. At this time, detents 378 and 380 will have been released to operative position with the result that, if cams 370 and 372 have not yet picked up their respective gear segments 354 and 356, the shafts 338 and 340 will, nevertheless, be restrained against reverse movement under the action of springs 362 and 364. Thus, hammering impacts under the action of these powerful springs are avoided.

The rocking of plate 286 and shaft 288, as just indicated, will result in clockwise movement of lever 310, as viewed in Figure 5, to effect locking of lever 24 in position to be engaged by the pin 18 of the gear segment 16 with the result that at the end of rotation of shaft 11 the segment will be withdrawn from mesh with pinion 8 and the shafts 11 and 32 will be brought to rest.

When the pin 322 is withdrawn from the movable member 324 of the switch, the arm 332 will, by the action of cam 336, be in position to maintain closure of the switch. At the end of the cycle of operation, the follower roller on lever 332 drops into the hollow portion of cam 336 whereupon the switch opens under the action of spring 330. It may also be noted that the lever 332 by dropping into the hollow in cam 336 prevents retrograde movement of shaft 11 when the parts are in rest position so that the spring 20 cannot rotate shaft 11 to bring gear segment 16 into chattering engagement with pinion 8 during overrun of the motor after it has been deenergized.

The operation of the machine so far described has been that normally involved in the issuance of tickets by means of combinations of keys 164 and 188. Since it is desirable to test the machine by the issuance of test tickets to make sure that its parts are operating properly, provision is made for accomplishing this result by the turning of shaft 418 through the use of knob 420, shaft 418 being rocked in a clockwise direction, as viewed in Figure 5, in effecting issue of test tickets.

Referring particularly to Figure 5, it will be noted that through arm 450 and link 452 the arm 306 will be rocked and through it link 308 which will trip the machine into operation as described above by the rocking of bell crank 310. The power operation of the machine will then, in general, take place as fully described above to effect printing and issuing of a test ticket and these power operations will not be here repeated.

In the case of this test operation, however, there will be no lever end 346 or 352 to limit the rotations of shafts 338 and 340 and, consequently, during the operation these shafts will rotate to the positions determined by the lowermost portions of cams 370 and 372. When in these positions the shafts will result in location of the printing wheels 74 and 76 so that there will be in printing position on each a printing surface carrying the word "test" or some other notation indicating that the ticket issued is not valid.

It is desirable to count the test tickets issued inasmuch as a further check on the operation of the machine is afforded if the number of real tickets issued plus the number of test tickets issued is equal to the difference between the serial numbers of opening and closing tickets. To effect counting of the test tickets there is provided the counter 434 which is operated as follows:

When the shaft 418 is rocked, as described above, to issue a test ticket the link 426 raises the link 428 to cause notch 430 to embrace pin 432 on the operating arm of the counter. During the cycle of operation the roller 448 rocks the lever 444 and through it lever 436 to impart a lengthwise movement to link 428 to actuate the counter. Return is effected by spring 449. At the end of the cycle of operation, when the rocking of lever 300 restores plate 286 to its upper position, pin 301 engaging the left-hand end of slot 453 restores shaft 418 to its original position and, consequently, disengages the counter 434 from the operating linkage.

Not only should the test tickets be counted but there should be no accumulation on the uppermost right-hand numbering head when a test ticket is issued. In order to secure this result, the rocking of shaft 418 moves downwardly the link guide 492' of the extreme right-hand column bringing the uppermost link 488 of this column out of alignment with the plate 484. Temporary latching through the continuance of the test ticket cycle is afforded by the yielding detent 555.

It may be noted that the record sheets illustrated in Figure 19 are placed in inverted position in the machine for the making of the records of various numbering heads. In order to make a record as, for example, at the opening and closing of the machine, the crank 580 is turned to secure an impact by the hammers 554 under the action of spring 562 when the roller 570 is released by the cam 572. By reason of the independent mountings of the various hammers 554, clear individual impressions of the serial numbers are secured despite the large area over which the complete printing takes place.

What is claimed is:

1. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, and means advancing each registering device of the second set following combined actuation of the member of the first set to which it corresponds and any member of the second set.

2. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, means advancing each registering device following combined actuation of the pair of members to which it corresponds, a second set of totalling registering devices, each of which corresponds to a single member of the first set, there being a registering device of said second set corresponding to each member of the first set, means advancing each registering device of the second set following combined actuation of the member of the first set to which it corresponds and any member of the second set, a third set of totalling registering devices, each of which corresponds to a single member of the second set, there being a registering device of said third set corresponding to each member of the second set, and means advancing each registering device of the third set following combined actuation of the member of the second set to which it corresponds and any member of the first set.

3. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, means advancing each registering device of the second set following combined actuation of the member of the first set to which it corresponds and any member of the second set, a total registering device, and means advancing said total registering device following actuation of every combination of members of the first and second sets.

4. In combination, a plurality of independently actuatable members of a first set, a plurality of independently actuatable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, means advancing each registering device of the second set following combined actuation of the member of the first set to which it corresponds and any member of the second set, a third set of totalling registering devices, each of which corresponds to a single member of the second set, there being a registering device of said third set corresponding to each member of the second set, means advancing each registering device of the third set following combined actuation of the member of the second set to which it corresponds and any member of the first set, a total registering device, and means advancing said total registering device following actuation of every combination of members of the first and second sets.

5. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, and means advancing each registering device of the second set following combined actuation of the member of the first set to which it corresponds and any member of the second set, the first mentioned set of registering devices being arranged in intersecting lines corresponding to the members of the first and second sets, each register being in the position of intersection of the lines of the members to which it corresponds, and each of the second set of registering devices being in the line of the member of the first set to which it corresponds.

6. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, means advancing each registering device of the second set following combined actuation of the member of the first set to which it corresponds and any member of the second set, a third set of totalling registering devices, each of which corresponds to a single member of the second set, there being a registering device of said third set corresponding to each member of the second set, and means advancing each registering device of the third set following combined actuation of the member of the second set to which it corresponds and any member of the first set, the first mentioned set of registering devices being arranged in intersecting lines corresponding to the members of the first and second sets, each register being in the position of intersection of the lines of the members to which it corresponds, each of the second set of registering devices being in the line of the member of the first set to which it corresponds, and each of the third set of registering devices being in the line of the member of the second set to which it corresponds.

7. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, means advancing each registering device of the second set following combined actuation of the member of the first set to which it corresponds and any member of the second set, a total registering device, and means advancing said total registering device following actuation of every combination of members of the first and second sets, the first mentioned set of registering devices being arranged in intersecting lines corresponding to the members of the first and second sets, each register being in the position of intersection of the lines of the members to which it corresponds, and each of the second set of registering devices being in the line of the member of the first set to which it corresponds.

8. In combination, a plurality of independently actuable members of a first set, a plurality of independently actuable members of a second set, a set of totalling registering devices, each of which corresponds to a single combination of a member of the first set with a member of the second set, there being a registering device for every combination of a member of the first set with a member of the second set, means advancing each registering device following combined actuation of the pair of members to which it corresponds, a second set of totalling registering devices, each of which corresponds to a single member of the first set, there being a registering device of said second set corresponding to each member of the first set, means advancing each registering device of the second set following combined actuation of the member of the first set to which it corresponds and any member of the second set, a third set of totalling registering devices, each of which corresponds to a single member of the second set, there being a registering device of said third set corresponding to each member of the second set, means advancing each registering device of the third set following combined actuation of the member of the second set to which it corresponds and any member of the first set, a total registering device, and means advancing said total registering device following actuation of every combination of members of the first and second sets, the first mentioned set of registering devices being arranged in intersecting lines corresponding to the members of the first and second sets, each register being in the position of intersection of the lines of the members to which it corresponds, each of the second set of registering devices being in the line of the member of the first set to which it corresponds, and each of the third set of registering devices being in the line of the member of the second set to which it corresponds.

References Cited in the file of this patent

UNITED STATES PATENTS

| | | |
|---|---|---|
| 1,911,863 | Webner | May 30, 1933 |
| 2,299,396 | Keen et al. | Oct. 20, 1942 |
| 2,335,122 | Julius et al. | Nov. 23, 1943 |
| 2,479,681 | Handley | Aug. 23, 1949 |
| 2,494,419 | Wells | Jan. 10, 1950 |
| 2,534,602 | Julius | Dec. 19, 1950 |
| 2,558,218 | Julius | June 26, 1951 |

FOREIGN PATENTS

| | | |
|---|---|---|
| 637,824 | Great Britain | May 24, 1950 |